United States Patent
Chiu et al.

(10) Patent No.: US 12,024,193 B2
(45) Date of Patent: Jul. 2, 2024

(54) VIOLATION INSPECTION SYSTEM BASED ON VISUAL SENSING OF SELF-DRIVING VEHICLE AND METHOD THEREOF

(71) Applicants: SQ Technology (Shanghai) Corporation, Shanghai (CN); Inventec Corporation, Taipei (TW)

(72) Inventors: Chaucer Chiu, Taipei (TW); Hai-Hong Sha, Shanghai (CN)

(73) Assignees: SQ Technology (Shanghai) Corporation, Shanghai (CN); Inventec Corporation, Taipei (TW)

(*) Notice: Subject to any disclaimer, the term of this patent is extended or adjusted under 35 U.S.C. 154(b) by 233 days.

(21) Appl. No.: 17/679,989

(22) Filed: Feb. 24, 2022

(65) Prior Publication Data

US 2023/0150530 A1   May 18, 2023

(30) Foreign Application Priority Data

Nov. 18, 2021 (CN) .......................... 202111368822.1

(51) Int. Cl.
*B60W 60/00* (2020.01)
*B60W 40/09* (2012.01)
*G06V 20/58* (2022.01)

(52) U.S. Cl.
CPC .......... *B60W 60/001* (2020.02); *B60W 40/09* (2013.01); *G06V 20/58* (2022.01); *B60W 2420/403* (2013.01)

(58) Field of Classification Search
CPC ............. B60W 60/001; B60W 30/182; G08G 1/0175; G08G 1/163; G08G 1/0137;
(Continued)

(56) References Cited

U.S. PATENT DOCUMENTS

| 8,694,328 B1 * | 4/2014 | Gormley | G06Q 30/0621 |
| | | | 705/26.7 |
| 11,749,111 B2 * | 9/2023 | Aoude | G08G 1/163 |
| | | | 340/907 |

(Continued)

FOREIGN PATENT DOCUMENTS

| CN | 109360423 A * | 2/2019 | ........... G08G 1/0175 |
| KR | 2174556 B1 * | 11/2020 | ........... G08G 1/0175 |

*Primary Examiner* — Yuri Kan
(74) *Attorney, Agent, or Firm* — David R. Stevens; Stevens Law Group (57) ABSTRACT

A violation inspection system based on visual sensing of a self-driving vehicle and a method thereof are disclosed. The violation inspection system receives traffic images captured by the self-driving vehicle, identifies image objects by artificial intelligence, continuously detects a movement status of each of the image objects, to generate image object dynamics; when the image object matches one of a trigger object factor and an association object factor, the image object and the image object dynamics thereof are inputted to an AI-based situation recognition model, to output a current situation, and when the current situation matches a violation situation template, the image objects corresponding to the trigger object factor and the association object factor corresponding to the violation situation template, and a violation item are outputted, so as to achieve the technical effect of improving accuracy and diversity in violation behavior determination.

11 Claims, 5 Drawing Sheets

(58) Field of Classification Search
CPC .. G06Q 30/0621; G06Q 50/26; H04L 9/3239; B60Q 5/006; A01K 15/023; H04W 4/38
See application file for complete search history.

(56) References Cited

U.S. PATENT DOCUMENTS

| | | | |
|---|---|---|---|
| 2016/0103218 A1* | 4/2016 | Mandava | B60Q 5/006 |
| | | | 701/301 |
| 2018/0027772 A1* | 2/2018 | Gordon | A01K 15/023 |
| 2019/0325754 A1* | 10/2019 | Aoude | G08G 1/163 |
| 2021/0042869 A1* | 2/2021 | Zheng | H04L 9/3239 |
| 2021/0304317 A1* | 9/2021 | Leise | H04W 4/38 |
| 2021/0358066 A1* | 11/2021 | Abusaad | G06Q 50/26 |

* cited by examiner

VIOLATION INSPECTION SYSTEM BASED ON VISUAL SENSING OF SELF-DRIVING VEHICLE AND METHOD THEREOF

BACKGROUND OF THE INVENTION

1. Field of the Invention

The present invention is related to a violation inspection system and a method thereof, and more particularly to a violation inspection system based on visual sensing of a self-driving vehicle and a method thereof.

2. Description of the Related Art

In recent years, with the popularity and vigorous development of self-driving vehicle technology, it is no longer uncommon to see self-driving vehicles appearing on the roads. The self-driving vehicle is equipped with camera devices and ranging devices to detect and identify various objects (or called targets) on the road, and equipped with a positioning system to obtain positioning coordinates, so it leads to the possibility of combining with other applications. Therefore, how to make full use of the self-driving vehicle to provide more added value has become one of the key issues in the industry.

In general, when driving on the road, the conventional self-driving vehicle continuously obtains an environmental status through the camera devices and the ranging devices, so as to perform adjustment and correction for driving in real time according to the change in the environmental status; therefore, the self-driving vehicle is very suitable to replace the conventional violation ban system which is based on fixed position or fixed route. However, the conventional self-driving vehicle is unable to automatically determine whether a violation event occurs in front of the vehicle by using the camera devices and the ranging devices, so the conventional self-driving vehicle only can obtain video evidence, and then the event is manually identified based on the video evidence afterwards. The above-mentioned conventional operation has a problem of insufficient convenience.

For this reason, some manufacturers propose a technical method of combining image recognition to automatically recognize whether the violation event occurs, and this technical method is to input image data into a trained artificial intelligence (AI) model, to identify image object and determine whether the violation event occurs according to a position change of the identified image object. However, this conventional method usually can only identify a single violation event in one screen image, for example, a vehicle not yielding to pedestrians, a vehicle turning illegally left and right, a vehicle crossing a double white line, a vehicle illegal parking, or a pedestrian crossing a road; as the complexity of the image is higher, the recognition accuracy is lower, that is, it is hard for the conventional method to accurately recognize multiple violation events. The conventional method has a problem that accuracy and diversity in the violation determination is insufficient.

According to above-mentioned contents, what is needed is to develop an improved technical solution to solve the conventional technology problem that the accuracy and diversity in the violation determination is insufficient.

SUMMARY OF THE INVENTION

An objective of the present invention is to disclose a violation inspection system based on visual sensing of a self-driving vehicle and a method thereof, in order to solve the conventional technology problem.

In order to achieve the objective, the present invention provides a violation inspection system based on visual sensing of a self-driving vehicle, the violation inspection system is configured to be installed on an onboard computer of the self-driving vehicle, applied to execute violation inspection along an inspection path and includes a microprocessor, a violation item database, an object type database, a situation recognition processor and a violation determination processor. The microprocessor is connected to a visual sensor of the self-driving vehicle, and configured to continuously receive a traffic image transmitted from the visual sensor, identify a plurality of image objects in the traffic image by an AI-based object identification algorithm, continuously detect a movement status of each of the plurality of image objects, and generate image object dynamics of each of the plurality of image objects. The violation item database is configured to store at least one violation situation template, and each of the at least one violation situation template corresponds to at least one violation item. The object type database is configured to store at least one association object factor and a trigger object factor. The situation recognition processor is connected to the microprocessor and the object type database, and configured to determine whether one of the plurality of image objects matches at least one of the trigger object factor and the association object factor, wherein when determining that the one of the plurality of image objects matches at least one of the trigger object factor and the association object factor, the situation recognition processor inputs the one of plurality of image objects and the image object dynamics corresponding thereto to at least one AI-based situation recognition model, to output a current situation. The violation determination processor is connected to the situation recognition processor and the violation item database, and configured to compare the current situation and the violation situation template, wherein when the current situation matches the violation situation template, the violation determination processor outputs the image objects corresponding to the trigger object factor and the association object factor corresponding to the violation situation template, and the violation item corresponding to the matched violation situation template.

In order to achieve the objective, the present invention further provides a violation inspection method based on visual sensing of a self-driving vehicle, the violation inspection method is configured to be installed on an onboard computer of the self-driving vehicle, applied to execute violation inspection along an inspection path and includes steps of: providing a violation item database and an object type database, wherein the violation item database stores at least one violation situation template, each of the at least one violation situation template corresponds to at least one violation item, and the object type database stores at least one association object factor and a trigger object factor; continuously receiving a traffic image, and identifying a plurality of image objects in the traffic image by an AI-based object identification algorithm model, and continuously detecting a movement status of each of the plurality of image objects to generate image object dynamics of each of the plurality of image objects; when the image object is determined to match at least one of the trigger object factor and the association object factor, inputting the image object and the image object dynamics corresponding thereto to at least one AI-based situation recognition model, to output a current situation; comparing the current situation with the violation situation template, and outputting the image objects corresponding to the trigger object factor and the association object factor corresponding to the violation situation template, and the corresponding violation item when the current situation matches the violation situation template.

According to the above-mentioned system and method of the present invention, the difference between the present invention and the conventional technology is that the violation inspection system of the present invention receives the traffic image captured by the self-driving vehicle, identifies the image objects by artificial intelligence, continuously detects the movement status of each image object, to generate the image object dynamics; when the image object matches at least one of the trigger object factor and the association object factor, the image object and the image object dynamics thereof are inputted to the AI-based situation recognition model, to output the current situation, and when the current situation matches the violation situation template, the image objects corresponding to the trigger object factor and the association object factor corresponding to the violation situation template, and the violation item are outputted.

Therefore, the technical solution of the present invention is able to achieve the technical effect of improving accuracy and diversity in violation behavior determination.

BRIEF DESCRIPTION OF THE DRAWINGS

The structure, operating principle and effects of the present invention will be described in detail by way of various embodiments which are illustrated in the accompanying drawings.

DETAILED DESCRIPTION OF THE PREFERRED EMBODIMENTS

The following embodiments of the present invention are herein described in detail with reference to the accompanying drawings. These drawings show specific examples of the embodiments of the present invention. These embodiments are provided so that this disclosure will be thorough and complete, and will fully convey the scope of the invention to those skilled in the art. It is to be acknowledged that these embodiments are exemplary implementations and are not to be construed as limiting the scope of the present invention in any way. Further modifications to the disclosed embodiments, as well as other embodiments, are also included within the scope of the appended claims.

These embodiments are provided so that this disclosure is thorough and complete, and fully conveys the inventive concept to those skilled in the art. Regarding the drawings, the relative proportions and ratios of elements in the drawings may be exaggerated or diminished in size for the sake of clarity and convenience. Such arbitrary proportions are only illustrative and not limiting in any way. The same reference numbers are used in the drawings and description to refer to the same or like parts. As used herein, the singular forms "a", "an" and "the" are intended to include the plural forms as well, unless the context clearly indicates otherwise.

It is to be acknowledged that, although the terms 'first', 'second', 'third', and so on, may be used herein to describe various elements, these elements should not be limited by these terms. These terms are used only for the purpose of distinguishing one component from another component. Thus, a first element discussed herein could be termed a second element without altering the description of the present disclosure. As used herein, the term "or" includes any and all combinations of one or more of the associated listed items.

It will be acknowledged that when an element or layer is referred to as being "on," "connected to" or "coupled to" another element or layer, it can be directly on, connected or coupled to the other element or layer, or intervening elements or layers may be present. In contrast, when an element is referred to as being "directly on," "directly connected to" or "directly coupled to" another element or layer, there are no intervening elements or layers present.

In addition, unless explicitly described to the contrary, the words "comprise" and "include", and variations such as "comprises", "comprising", "includes", or "including", will be acknowledged to imply the inclusion of stated elements but not the exclusion of any other elements.

Figure 1:
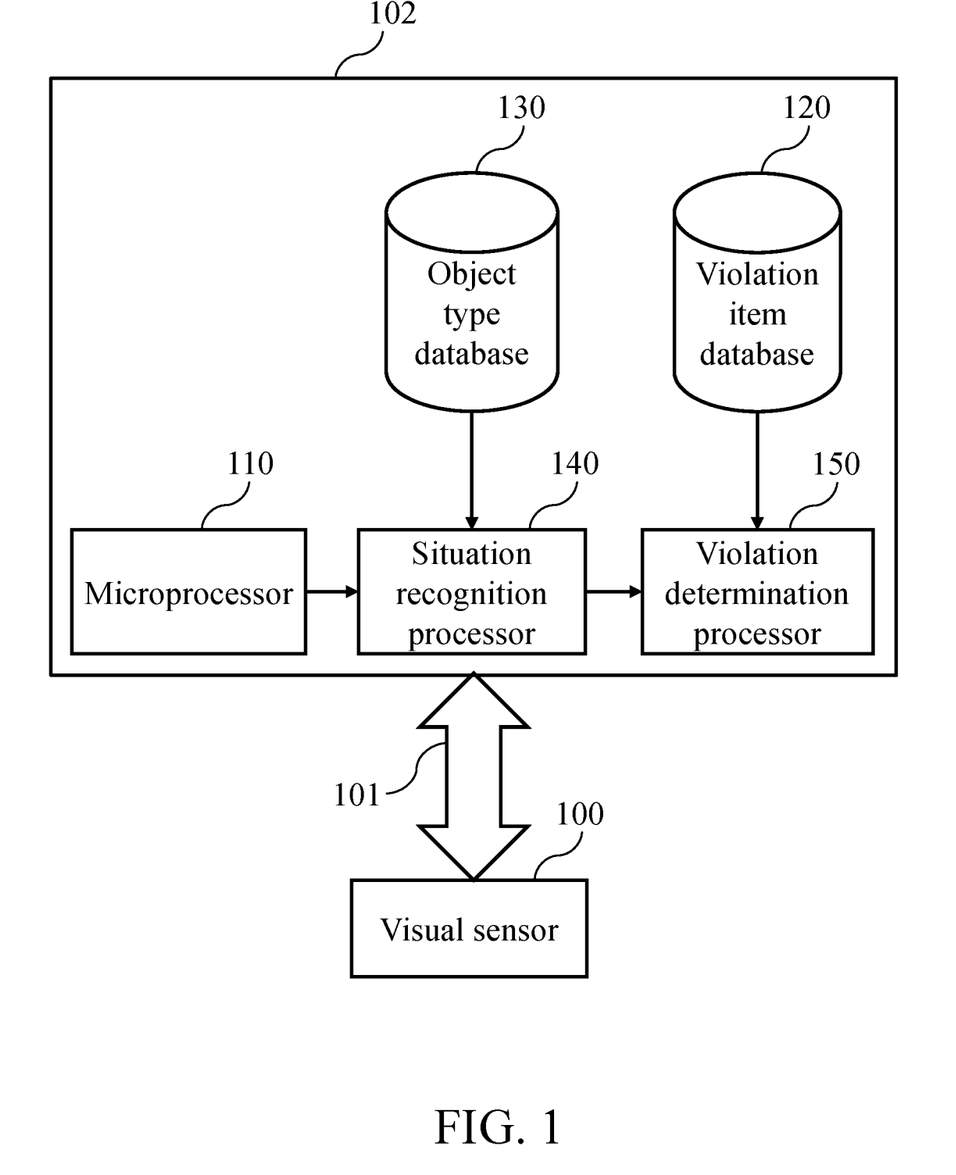
FIG. 1 is a system block diagram of a violation inspection system based on visual sensing of self-driving vehicle, according to the present invention.

Please refer to FIG. 1, which is a system block diagram of a violation inspection system based on visual sensing of a self-driving vehicle, according to the present invention. The violation inspection system is configured to be installed on an onboard computer 102 of the self-driving vehicle, applied to execute violation inspection along an inspection path and includes a microprocessor 110, a violation item database 120, an object type database 130, a situation recognition processor 140 and a violation determination processor 150. The onboard computer 102 is connected to a visual sensor 100 of the self-driving vehicle through data bus 101, and continuously receives a traffic image transmitted from the visual sensor 100, identifies image objects contained in the traffic image through an AI-based object identification algorithm, continuously detects a movement status of each image object, so as to generate image object dynamics of each image objects. For example, in a condition that the traffic image contains a pedestrian, a vehicle, a marking and a sign, the AI-based object identification algorithm, such as Region based Convolutional Neural Network (R-CNN) model based on deep learning, Fast Region based Convolutional Neural Network (Fast R-CNN) model, mask R-CNN model, or YOLO model, can be used to identify the pedestrian, the vehicle, the marking and the sign as the image objects, and the movement status (such as a movement trace) of each image object is continuously detected, so as to generate the image object dynamics of each image object. In actual implementation, the microprocessor 110 can be replaced or implemented by a micro control unit (MCU), a central processing unit (CPU) or a system on a chip (SOC).

The violation item database 120 stores violation situation templates, and each violation situation template corresponds to at least one violation item. For example, the at least one violation item is provided as the violation situation template in advance, such as, the violation item can be a situation that a vehicle fails to yield to pedestrians, a vehicle illegally left and right turns, a vehicle crosses double white lines, a vehicle illegal parks, pedestrian crosses the road, or any combination thereof. For example, the violation situation template of a pedestrian crossing the road can include the pedestrian object having the image object dynamics of crossing a road, which has no marking object.

The object type database 130 stores an association object factor and a trigger object factor. The association object factor can include, for example, a vehicle object, an article object, a sign object, a marking object or a situation object; the trigger object factor can include, for example, a pedestrian object. In actual implementation, when the object matching the trigger object factor occurs in the traffic image, the violation determining process is triggered to determine the violation item in cooperation with the objects of association object factor.

The situation recognition processor 140 is connected to the microprocessor 110 and the object type database 130. When determining that the image object matches at least one of the trigger object factor and the association object factor, the situation recognition processor 140 inputs the image object and the image object dynamics thereof to the AI-based situation recognition model, to output a current situation. For example, in a condition that the identified image objects are the pedestrian object, the vehicle object and the marking object, the pedestrian object is belonged to the trigger object factor, the vehicle object and the marking object are belonged to the association object factor, so the situation recognition processor 140 determines that the image objects matches at least one of the trigger object factor and the association object factor, and inputs the image object and the image object dynamics thereof to the situation recognition model, to output the current situation, such as the situation of walking pedestrian, the situation of the vehicle turning left, or the situation of walking pedestrian and the turning vehicle. In practice, the AI-based situation recognition model is trained completely with long-term situation model establishing through big data (that is, data of objects and situations) by deep learning technology, for example, the AI-based situation recognition model can include two convolution neural network (CNN) models, one is a Faster R-CNN model to inspect the presence of pedestrian or vehicle, and the other is a deep CNN (DCNN) model to identify the movement status of the inspected pedestrian or vehicle, and the outputs of the two models are integrated as the current situation. Similarly, the above-mentioned manner can be applied to establish the violation situation template; the violation situation template includes the image objects of the association object factor and the trigger object factor, and the movement statuses of the image objects; in addition, the current situation includes the object images and the corresponding image object dynamics. When it detects that the violation situation template is matched because the image object dynamics of the trigger object factor is blocked by the association object factor, the determination for the corresponding image object as the violation target is cancelled, that is, the violation event which is determined because the image object corresponding to the trigger object factor is blocked by the association object factor is considered that the image object corresponding to the trigger object factor does not violate a traffic rule. For example, when the image object dynamics of the pedestrian object is blocked by the article object and determined as violation, the pedestrian object is considered to not violate the traffic rule.

The violation determination processor 150 is connected to the situation recognition processor 140 and the violation item database 120, and configured to compare the current situation and the violation situation template. When the current situation matches the violation situation template, the violation determination processor 150 outputs the image objects corresponding to the trigger object factor and the association object factor corresponding to the violation situation template, and the corresponding violation item; for example, when the current situation includes a walking pedestrian and a turning vehicle, the current situation is compared with the violation situation template including the violation item of pedestrian crossing road and the violation item of vehicle not yielding pedestrian. In actual implementation, when the current situation matches the violation situation template, a camera device is triggered to record video, and a positioning device is synchronously triggered to obtain a violation coordinate and store the violation coordinate to the violation item database 120, so that the violation coordinate is mapped to the violation situation template. In this way, when the self-driving vehicle is moved to the violation coordinate, the violation situation template corresponding to the violation coordinate is loaded to compare with the current situation with a high priority. Therefore, the violation determination for the violation situation, which had occurred at the fixed coordinate position, with a high priority can effectively improve efficiency and accuracy in determination. In addition, when the violation coordinate is obtained, the optimal inspection path can be dynamically calculated according to the distribution of the violation coordinates, and the original inspection path can be replaced by the optimal inspection path. For example, in a condition that two violation coordinates are obtained, the shortest path passing through the two violation coordinates can be calculated as the optimal inspection path based on map data. In addition, the violation determination processor 150 can execute at least one of the face recognition and the license plate recognition on the outputted image object, to generate a recognition result (such as face features or license plate information) and transmit the recognition result to an external database (such as a household registration database or a vehicle registration database), so as to query whether the recognition result matches a notification target. When the recognition result matches a notification target, the outputted image object and the violation coordinate thereof are transmitted to a notification unit, such as judicial units including procuration, police or other).

It is to be particularly noted that, in actual implementation, the processors of the present invention can be implemented by various manners, for example, one or more processor of the system can be implemented by integrated circuit chip, system on chip (SOC), a complex programmable logic device (CPLD), or a field programmable gate array (FPGA). The concept of the present invention can be implemented by a system, a method and/or a computer program. The computer program can include computer-readable storage medium which records computer readable program instructions, and the processor can execute the computer readable program instructions to implement concepts of the present invention. The computer-readable storage medium can be a tangible apparatus for holding and storing the instructions executable of an instruction executing apparatus Computer-readable storage medium can be, but not limited to electronic storage apparatus, magnetic storage apparatus, optical storage apparatus, electromagnetic storage apparatus, semiconductor storage apparatus, or any appropriate combination thereof. More particularly, the computer-readable storage medium can include a hard disk, an RAM memory, a read-only-memory, a flash memory, an optical disk, a floppy disc or any appropriate combination thereof, but this exemplary list is not an exhaustive list. The computer-readable storage medium is not interpreted as the instantaneous signal such a radio wave or other freely propagating electromagnetic wave, or electromagnetic wave propagated through waveguide, or other transmission medium (such as optical signal transmitted through fiber cable), or electric signal transmitted through electric wire. Furthermore, the computer readable program instruction can be downloaded from the computer-readable storage medium to each calculating/processing apparatus, or downloaded through network, such as internet network, local area network, wide area network and/or wireless network, to external computer equipment or external storage apparatus. The network includes copper transmission cable, fiber transmission, wireless transmission, router, firewall, switch, hub and/or gateway. The network card or network interface of each calculating/processing apparatus can receive the computer readable program instructions from network, and forward the computer readable program instruction to store in computer-readable storage medium of each calculating/processing apparatus. The computer program instructions for executing the operation of the present invention can include source code or object code programmed by assembly language instructions, instruction-set-structure instructions, machine instructions, machine-related instructions, micro instructions, firmware instructions or any combination of one or more programming language. The programming language include object oriented programming language, such as Common Lisp, Python, C++, Objective-C, Smalltalk, Delphi, Java, Swift, C #, Perl, Ruby, and PHP, or regular procedural programming language such as C language or similar programming language. The computer readable program instruction can be fully or partially executed in a computer, or executed as independent software, or partially executed in the client-end computer and partially executed in a remote computer, or fully executed in a remote computer or a server.

Figure 2A:
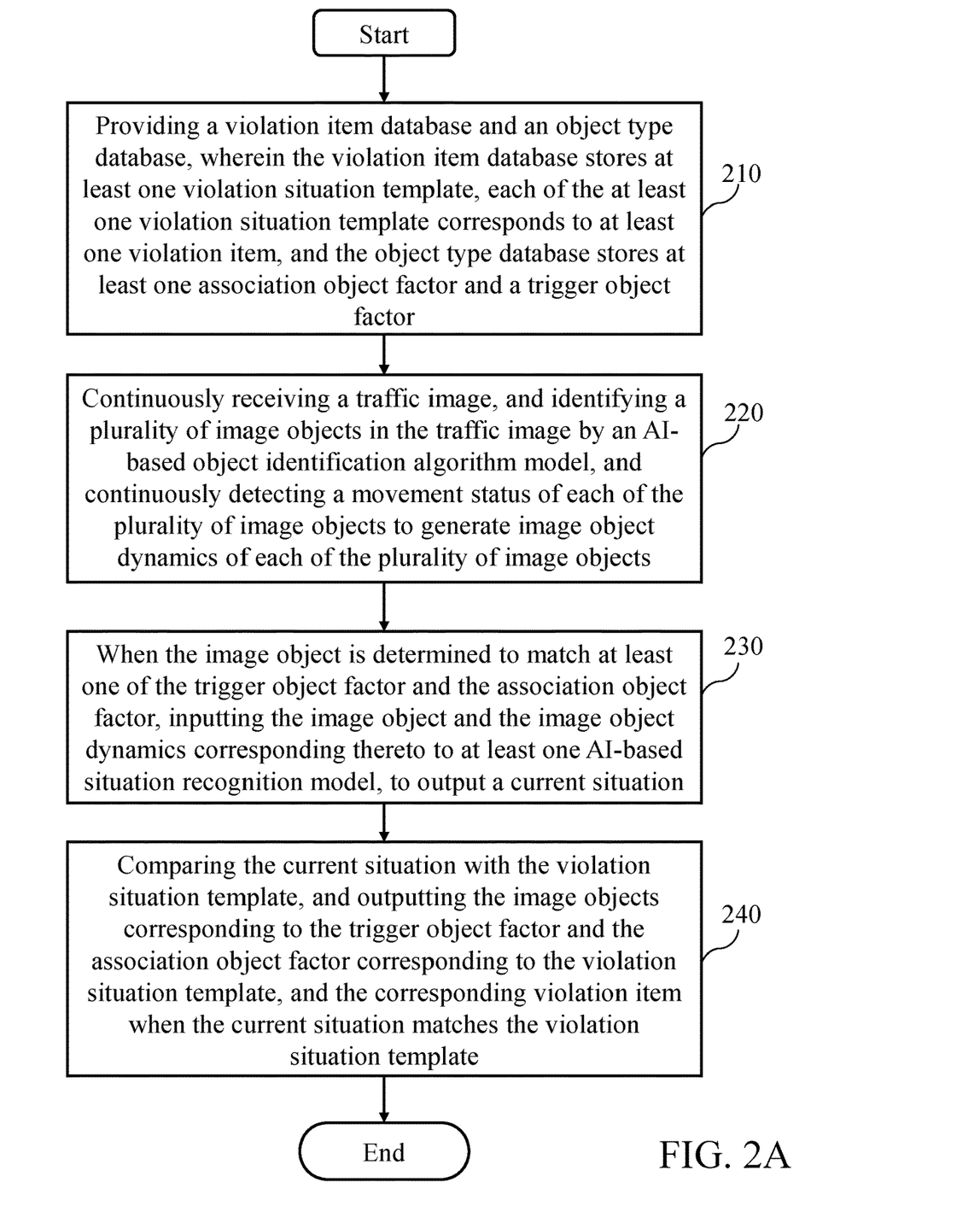
FIG. 2A is a flowchart of a violation inspection method based on visual sensing of self-driving vehicle, according to the present invention.

Please refer to FIG. 2A, which is a flowchart of a violation inspection method based on visual sensing of self-driving vehicle, according to the present invention. As shown in FIG. 2A, the violation inspection method is applied to execute violation inspection along an inspection path, and includes the following steps. In a step 210, a violation item database and an object type database are provided. The violation item database stores at least one violation situation template, each of the at least one violation situation template corresponds to at least one violation item, and the object type database stores at least one association object factor and a trigger object factor. In a step 220, a traffic image is continuously received, and a plurality of image objects in the traffic image is identified by an AI-based object identification algorithm model, and a movement status of each of the plurality of image objects is continuously detected to generate image object dynamics of each of the plurality of image objects. In a step 230, when the image object is determined to match at least one of the trigger object factor and the association object factor, the image object and the image object dynamics corresponding thereto are inputted to at least one AI-based situation recognition model, to output a current situation. In a step 240, the current situation is compared with the violation situation template, and the image objects corresponding to the trigger object factor and the association object factor corresponding to the violation situation template, and the corresponding violation item are outputted when the current situation matches the violation situation template. In this way, the violation inspection method is to receive the traffic image captured by the self-driving vehicle, identify the image objects in the traffic image by the artificial intelligence, continuously detect the movement status of each image object to generate the image object dynamics, and input the image object and the image object dynamics thereof to the AI-based situation recognition model to output the current situation when the image object matches at least one of the trigger object factor and the association object factor, and output the image objects corresponding to the trigger object factor and the association object factor corresponding to the violation situation template, and the corresponding violation item when the current situation matches the violation situation template. Therefore, the effect of improving accuracy and diversity in violation behavior determination can be achieved.

Figure 2B:
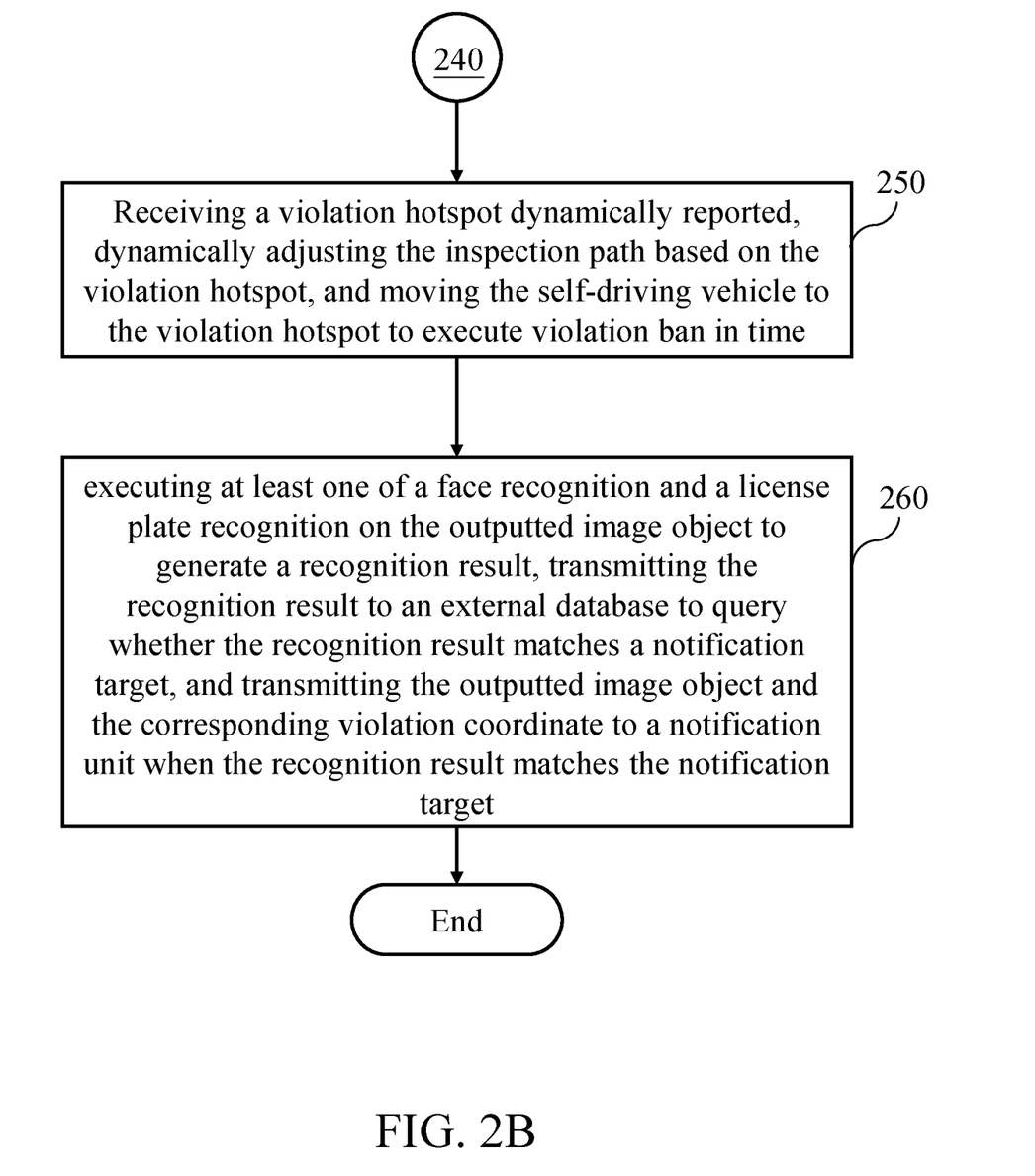
FIG. 2B is a flowchart of another embodiment of a violation inspection method based on visual sensing of self-driving vehicle, according to the present invention.

Please refer to FIG. 2B, which is a flowchart of another embodiment of a violation inspection method based on visual sensing of a self-driving vehicle, according to the present invention. The another embodiment can include a step 250 or a step 260 after the step 240. In the step 250, a violation hotspot which is dynamically reported is received, and the inspection path is dynamically adjusted based on the violation hotspot, so as to move the self-driving vehicle to the violation hotspot to execute the violation ban in time. For example, when the self-driving vehicle receives a location "A" dynamically reported as the violation hotspot, the self-driving vehicle dynamically adjusts the inspection path based on the violation hotspot, and the self-driving vehicle will be moved to the location "A" for executing the violation ban immediately. In addition, in a step 260, the self-driving vehicle can execute at least one of the face recognition and the license plate recognition on the outputted image object, to generate the recognition result and transmit the recognition result to the external database, to query whether the outputted image object matches the notification target. When the recognition result matches a notification target, the self-driving vehicle transmits the outputted image object and the violation coordinate corresponding thereto to the notification unit. For example, the face recognition can be performed on the image object to obtain the face features, or the license plate recognition can be performed on the image object to obtain the license plate information, and the recognition result is transmitted to the external database for comparison, to query whether the recognition result matches the notification target such as a wanted criminal or a stolen vehicles; when the recognition result matches the notification target, the image object and the violation coordinate corresponding thereto are transmitted to the notification unit, such as prosecution, police or similar judicial units.

Figure 3:
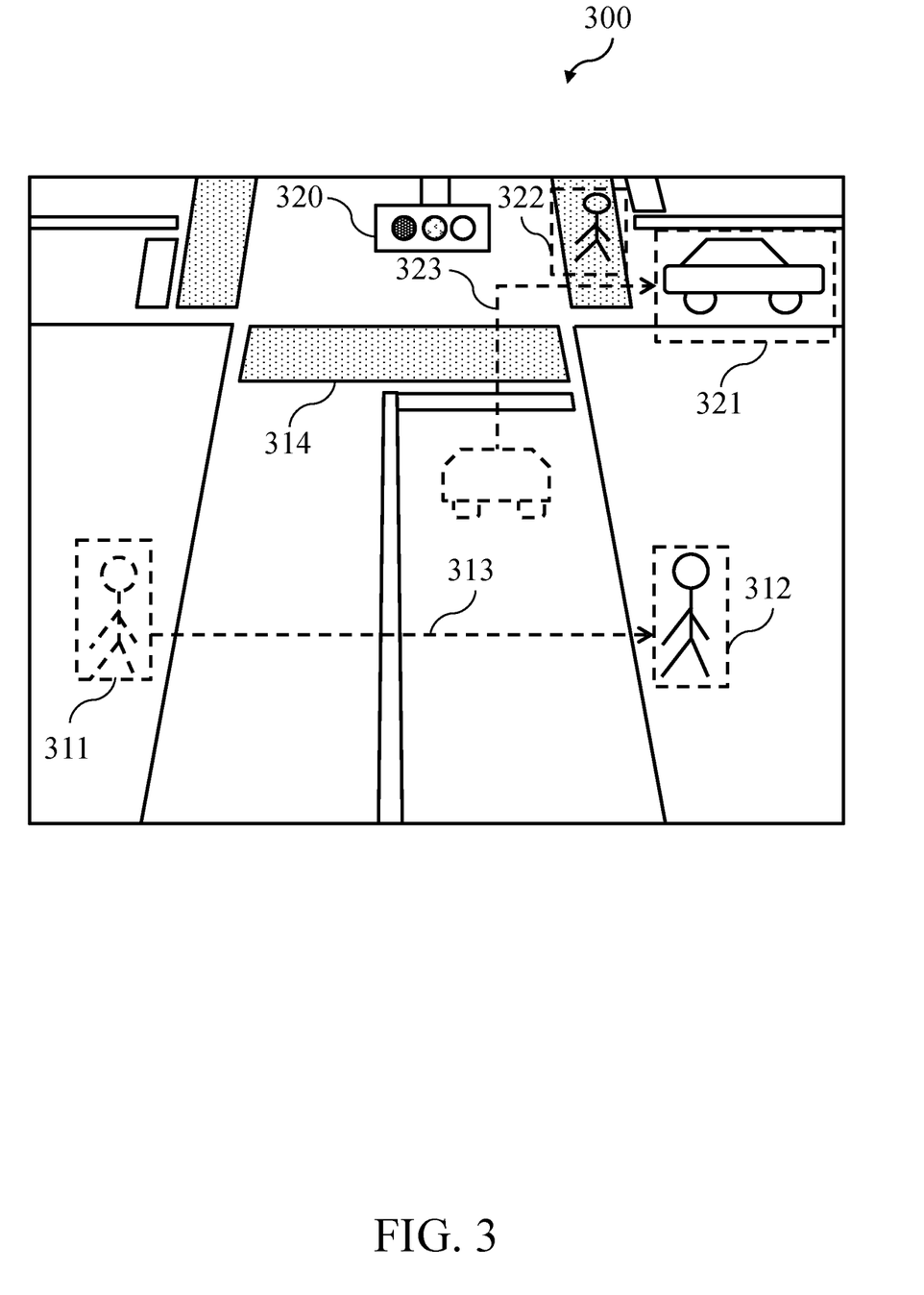
FIG. 3 is a schematic view showing an operation of performing violation inspection, according to application of the present invention.

The practical operations of the present invention will be described based on embodiment with reference to FIGS. 3 and 4. Please refer to FIG. 3, which is a schematic view showing an operation of performing violation inspection, according to application of the present invention. When the self-driving vehicle executes violation inspection along an inspection path, the self-driving vehicle continuously generates traffic images 300 through the visual sensor of the self-driving vehicle, the microprocessor 110 continuously receives the traffic images, and identifies image objects in the traffic images 300 by the AI-based object identification algorithm, such as pedestrian objects 312 and 322, a sign object 320, a vehicle object 321, and a marking object 314. Particularly, the object identification algorithm can be the bounding box predictions algorithm, non-max suppression algorithm, or other similar algorithm. Next, the self-driving vehicle continuously detects a movement status of each image object, for example, the self-driving vehicle detects the movement status of pedestrian object 312 to generate corresponding image object dynamics 313, and the movement status of pedestrian object 312 is the movement from the previous position 311 to the current position; for example, the self-driving vehicle detects the movement status of the vehicle object 321 to generate corresponding image object dynamics 323. In an embodiment, the optical flow method is to render each of pixels of the image to have a velocity vector, and correspond pixels of the image to points of a three-dimensional object one by one based on a projection relationship during movement, and perform dynamic analysis on the image object based on velocity vector features of the pixels, so as to generate the image object dynamics 313 and 323.

Next, the situation recognition processor 140 determines whether the image object matches the trigger object factor and the at least one association object factor at the same time; for example, the pedestrian objects 312 and 322 are the trigger object factors, the marking object 314, the sign object 320 and the vehicle object 321 are the association object factors, the presence of the trigger object factor and the association object factor at the same time indicates the image objects matches the above-mentioned condition. Next, the image object and the image object dynamics thereof are inputted to the AI-based situation recognition model, to output the current situation; that is, the situation recognition processor 140 identifies which situation exists in the traffic image based on the pedestrian object 312, the vehicle object 321, the sign object 320, the marking object 314, and the image object dynamics thereof. For example, the current situation can be a situation including the pedestrian object 312, the sign object 320 and the vehicle object 321, or a situation including the pedestrian object 312 and the marking object 314. Next, the violation determination processor 150 compares the current situation and the violation situation template, to confirm which violation item exists in the current situation; for example, when the comparison result indicates that the current situation matches the violation situation template of a pedestrian crossing road and the violation situation template of a vehicle not yielding pedestrian, the violation determination processor 150 outputs the trigger object factors corresponding to the two violation situation templates. For example, when the comparison result indicates that the current situation matches the first violation situation template which is the violation situation template of pedestrian crossing the road, the image objects (such as the pedestrian image and marking image) corresponding to the trigger object factor (that is, the pedestrian object 312) and the association object factor (that is, the marking object 314) are outputted, and corresponding violation item of a pedestrian crossing the road is also outputted. For example, when the comparison result indicates that the current situation matches the second violation situation template which is the violation situation template of a vehicle not yielding pedestrian, the image objects (such as the pedestrian image, the sign image and the vehicle image) of the trigger object factor (the pedestrian object 322) and the association object factors (the sign object 320 and the vehicle object 321) are outputted, and corresponding violation item of a vehicle not yielding to pedestrians is also outputted. Besides the above-mentioned examples, it is to be particularly noted that a violation situation template can include at least one violation item, such as the violation item of a pedestrian crossing road and the violation item of a vehicle not yielding pedestrian. As a result, the operation of inspecting and storing the image objects associated with the violation item in the situation wherein multiple violation items exit, can be completed.

Figure 4:
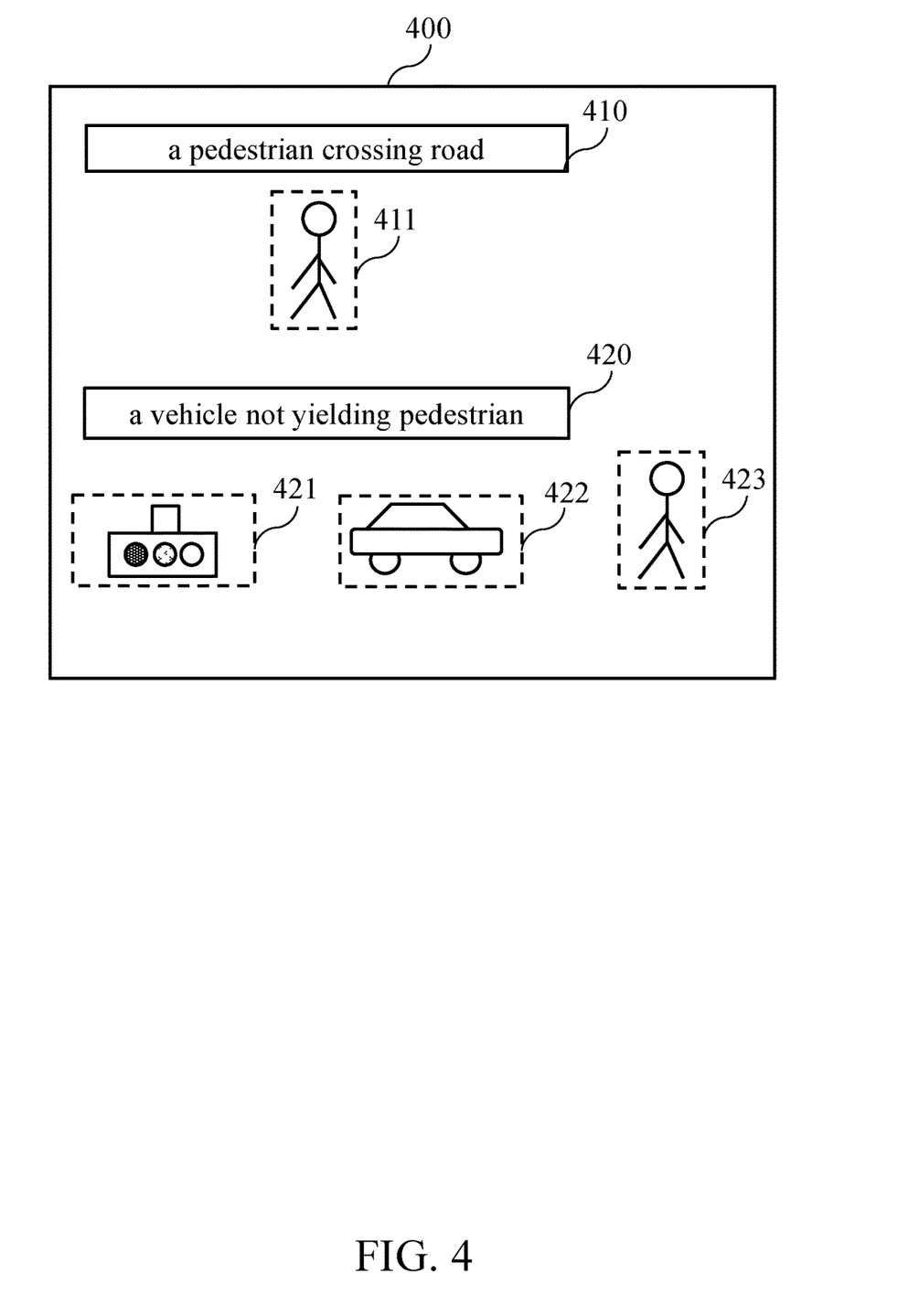
FIG. 4 is a schematic view an operation of outputting an image object and a violation item associated a violation event, according to application of the present invention.

As shown in FIG. 4, which is a schematic view an operation of outputting an image object and a violation item associated a violation event, according to an application of the present invention. In actual implementation, when the current situation matches the violation situation template, the output screen 400 displays the image related to the violation event, to facilitate collecting evidences. For example, in the case of the pedestrian crossing road, the violation item display block 410 can display a text of "a pedestrian crossing road" and display the pedestrian object 411 below the text; in the case of a vehicle not yielding pedestrian, the violation item display block 420 can display a text of "a vehicle not yielding pedestrian" and display the sign object 421, the vehicle object 422 and the pedestrian object 423 below the text. These objects can be stored in the violation item database through picture, image or a combination thereof.

According to above-mentioned contents, according to the above-mentioned content, the difference between the present invention and the conventional technology is that the violation inspection system of the present invention receives the traffic image captured by the self-driving vehicle, identifies the image objects by artificial intelligence, continuously detects the movement status of each image object, to generate the image object dynamics; when the image object matches at least one of the trigger object factor and the association object factor, the image object and the image object dynamics thereof are inputted to the AI-based situation recognition model, to output the current situation, and when the current situation matches the violation situation template, the image objects corresponding to the trigger object factor and the association object factor corresponding to the violation situation template, and the violation item are outputted, so that the technical effect of improving accuracy and diversity in violation behavior determination can be achieved. Therefore, the technical solution of the present invention can solve conventional technology problem that the accuracy and diversity in the violation determination is insufficient.

The present invention disclosed herein has been described by means of specific embodiments. However, numerous modifications, variations and enhancements can be made thereto by those skilled in the art without departing from the spirit and scope of the disclosure set forth in the claims.

What is claimed is:

1. A violation inspection system based on visual sensing of a self-driving vehicle, configured to be installed on an onboard computer of the self-driving vehicle, applied to execute violation inspection along an inspection path, and the violation inspection system comprising:
   a microprocessor connected to a visual sensor of the self-driving vehicle, and configured to continuously receive a traffic image transmitted from the visual sensor, identify a plurality of image objects in the traffic image by an AI-based object identification algorithm, continuously detect a movement status of each of the plurality of image objects, and generate image object dynamics of each of the plurality of image objects;
   a violation item database configured to store at least one violation situation template, wherein each of the at least one violation situation template corresponds to at least one violation item;
   an object type database configured to store at least one association object factor and a trigger object factor;
   a situation recognition processor connected to the microprocessor and the object type database, and configured to determine whether one of the plurality of image objects matches at least one of the trigger object factor and the association object factor, wherein when determining that the one of the plurality of image objects matches at least one of the trigger object factor and the association object factor, the situation recognition processor inputs the one of plurality of image objects and the image object dynamics corresponding thereto to at least one AI-based situation recognition model, to output a current situation; and a violation determination processor connected to the situation recognition processor and the violation item database, and configured to compare the current situation and the violation situation template, wherein when the current situation matches the violation situation template, the violation determination processor outputs the image objects corresponding to the trigger object factor and the association object factor corresponding to the violation situation template, and the violation item corresponding to the matched violation situation template, and wherein the microprocessor receives a violation hotspot dynamically reported and dynamically adjusts the inspection path based on the violation hotspot, and wherein the microprocessor controls the self-driving vehicle to move to the violation hotspot to execute violation ban in time.

2. The violation inspection system based on visual sensing of self-driving vehicle according to claim 1, wherein the violation situation template comprises object images and movement statuses of the association object factor and the trigger object factor, the current situation comprises the object image and the corresponding image object dynamics, wherein when detecting that the violation situation template is matched because the image object dynamics of the trigger object factor is blocked by the association object factor, the violation determination processor cancels the determination for the corresponding image object as a violation target.

3. The violation inspection system based on visual sensing of self-driving vehicle according to claim 1, wherein when the current situation matches the violation situation template, the violation determination processor triggers at least one camera device to record video, and synchronously triggers a positioning device to obtain a violation coordinate, and stores the violation coordinate to the violation item database, so as to map the violation coordinate to the violation situation template.

4. The violation inspection system based on visual sensing of self-driving vehicle according to claim 3, wherein when the self-driving vehicle moves to the violation coordinate, the violation determination processor loads the violation situation template corresponding to the violation coordinate, to compare the loaded violation situation template with the current situation with a high priority.

5. The violation inspection system based on visual sensing of self-driving vehicle according to claim 3, wherein the microprocessor dynamically calculates an optimal inspection path according to a distribution of the violation coordinates, and replaces the inspection path by the optimal inspection path.

6. The violation inspection system based on visual sensing of self-driving vehicle according to claim 3, wherein the violation determination processor executes at least one of a face recognition and a license plate recognition on the outputted image object to generate a recognition result, transmits the recognition result to an external database to query whether the recognition result matches a notification target, and when the recognition result matches the notification target, the outputted image object and the corresponding violation coordinate are transmitted to a notification unit.

7. A violation inspection method based on visual sensing of a self-driving vehicle, configured to be installed on an onboard computer of the self-driving vehicle, applied to execute violation inspection along an inspection path, and the violation inspection method comprising:

providing a violation item database and an object type database, wherein the violation item database stores at least one violation situation template, each of the at least one violation situation template corresponds to at least one violation item, and the object type database stores at least one association object factor and a trigger object factor;

continuously receiving a traffic image, and identifying a plurality of image objects in the traffic image by an AI-based object identification algorithm model, and continuously detecting a movement status of each of the plurality of image objects to generate image object dynamics of each of the plurality of image objects;

when the image object is determined to match at least one of the trigger object factor and the association object factor, inputting the image object and the image object dynamics corresponding thereto to at least one AI-based situation recognition model, to output a current situation; and comparing the current situation with the violation situation template, and outputting the image objects corresponding to the trigger object factor and the association object factor corresponding to the violation situation template, and the corresponding violation item when the current situation matches the violation situation template, wherein when the current situation matches the violation situation template, triggering at least one camera device to record video, synchronously triggering a positioning device to obtain a violation coordinate, and storing the violation coordinate to the violation item database, so as to map the violation coordinate to the violation situation template, wherein the self-driving vehicle is controlled to move to the violation coordinate, and wherein when the self-driving vehicle is controlled to move to the violation coordinate, loading the violation situation template corresponding to the violation coordinate, to compare the loaded violation situation template with the current situation with a high priority.

8. The violation inspection method based on visual sensing of self-driving vehicle according to claim 7, wherein the violation situation template comprises object images and movement statuses of the association object factor and the trigger object factor, the current situation comprises the object image and the corresponding image object dynamics, wherein when detecting that the violation situation template is matched because the image object dynamics of the trigger object factor is blocked by the association object factor, cancels the determination for the corresponding image object as a violation target.

9. The violation inspection method based on visual sensing of self-driving vehicle according to claim 7, further comprising: dynamically calculating an optimal inspection path according to a distribution of the violation coordinates, and replacing the inspection path by the optimal inspection path.

10. The violation inspection method based on visual sensing of self-driving vehicle according to claim 7, further comprising:
receiving a violation hotspot dynamically reported, dynamically adjusting the inspection path based on the violation hotspot, and moving the self-driving vehicle to the violation hotspot to execute violation ban in time.

11. The violation inspection method based on visual sensing of self-driving vehicle according to claim 7, further comprising:
executing at least one of a face recognition and a license plate recognition on the outputted image object to generate a recognition result, transmitting the recognition result to an external database to query whether the recognition result matches a notification target; and when
the recognition result matches the notification target, transmitting the outputted image object and the corresponding violation coordinate to a notification unit.

\* \* \* \* \*